3,132,184
PURIFICATION OF 1,6-DINITRONAPHTHALENE AND PRODUCTS THEREFROM
Julius Hyman, Piedmont, Donald C. Morrison, Berkeley, and Herbert P. C. Lee, Albany, Calif., assignors to Fundamental Research Company, Berkeley, Calif., a partnership
No Drawing. Filed May 4, 1961, Ser. No. 107,650
13 Claims. (Cl. 260—645)

This invention relates to naphthalene chemistry. More particularly, it is concerned with the chemistry of certain dinitronaphthalenes, and, most specifically, with a process for the preparation of 1,6-dinitronaphthalene from its admixture with 1,7-dinitronaphthalene and with the products obtained in the carrying out of that process.

Pure 1,6-dinitronaphthalene has not hitherto been available commercially in spite of its great potential value as an intermediate in the preparation of many organic compounds, as, for example, steroids and other medicinals; naphthalenediamines useful as anti-oxidants for rubber; aminonaphthalene dyestuffs; and naphthalene diisocyanates, important reactants in the production of urethane foams. A need exists therefore for a method of preparing large quantities of 1,6-dinitronaphthalene in relatively pure form at reasonable cost. The present invention provides such a method.

A principal object of the invention is therefore a process for preparing 1,6-dinitronaphthalene in relatively pure form at reasonable cost.

A further object of the invention is an effective method of separating 1,6-dinitronaphthalene in relatively pure form from its admixture with 1,7-dinitronaphthalene.

Still another object of the invention is a method of separating 1,6-dinitronaphthalene in relatively pure form from its admixture with 1,7-dinitronaphthalene, in which method the 1,7-dinitronaphthalene is converted into other naphthalene derivatives of value.

The attainment of these and other objects of the invention will become apparent on further reading of this specification and the appended claims.

A simple and greatly improved method of obtaining 1,6-dinitronaphthalene in admixture with 1,7-isomer by dinitration of 2-nitronaphthalene is described in the copending application of Julius Hyman and Herbert P. C. Lee, Serial No. 1,427, filed January 11, 1960, now U.S. Patent No. 3,065,277. The product resulting from this dinitration is a mixture of about 50 percent each of 1,6-dinitronaphthalene and 1,7-dinitronaphthalene, with variations up to about 10 percent depending on the particular conditions of preparation. From this mixture about one-sixth of the 1,6-isomer may be recovered in relatively pure form from such solvents as methylene chloride, acetone or isopropanol; the remaining dinitronaphthalene mixture, however, can be resolved only by gas or column chromatography methods which in the present state of the art do not lend themselves to commercial or industrial application.

We have now found that 1,6-dinitronaphthalene may be recovered from such admixtures with the 1,7-isomer in nearly quantitative yields and in relatively pure form by reacting the mixture at moderate temperatures with a solution of proper concentration of an alkaline reagent which may be either (1) an alcoholic solution of an alkali metal alkoxide, e.g. sodium or potassium methoxide or ethoxide in methanol or ethanol respectively, or (2) an alcoholic (in methanol or ethanol) solution of an alkali metal hydroxide, or (3) an aqueous solution of an alkali metal hydroxide or carbonate or alkaline earth metal hydroxide, e.g. sodium or potassium hydroxide or carbonate, or calcium or barium hydroxide, the choice of reagent in this third group being dictated in part by its solubility in the particular solvent concerned. In either case the 1,7-isomer is converted by the reaction into soluble products, while the 1,6-isomer is substantially unaffected. The use of alkali metal alkoxide in methanol is generally preferred, since it converts the 1,7-isomer to the valuable 4,6-dinitro-1-naphthol and/or its methyl ether, or into 8-nitro-2-nitroso-1-naphthol (also called 8-nitro-1,2-naphthoquinone-2-oxime), depending on the concentration of the alkaline reagent employed. A further advantage accruing from the use of the alkoxide is that the unaffected 1,6-isomer is more readily washed free of impurities than when the other alkaline reagents mentioned are employed. When economical preparation and recovery of the 1,6-isomer is the primary consideration, however, the use of an aqueous solution of one of the water-soluble (and water-stable) alkaline reagents has its obvious advantages.

We have found, in general, that the use of highly concentrated solutions of the alkaline reagents employed is not necessary, and, in some cases, may be actually destructive, particularly of the reaction products of 1,7-dinitronaphthalene. The permissible use of dilute solutions adds to the attractiveness of the process of our invention.

Because of the somewhat limited solubility of the mixture of 1,6- and 1,7-isomers in methanol and ethanol, the required volume of either of these solvents in a reaction mixture may be sharply reduced, if desired, by the use of a co-solvent, such as benzene, in which the isomers are much more soluble. In Example 3 given below, for instance, a mixture of 100 parts by weight of methanol and 100 parts of benzene is sufficient to dissolve the 6 parts of the mixed isomers, whereas if methanol alone were employed, at least 800 parts would be required. While the use of a co-solvent like benzene may add a procedural step, it results in considerable over-all economy in recovery costs.

While recovery of the reaction products of the 1,7-isomer is important, the process may be carried out in two steps, as is also described in Example 3.

Partial purification of the impure 1,6-dinitronaphthalene separated from any of the reaction mixtures described may be effected in many cases by treatment with a solvent, such as acetone, in which the 1,6-isomer is soluble, and separating this solution from the insoluble matter by filtration, and evaporating the solvent from the filtrate. In almost any case, the residual 1,6-dinitronaphthalene, however separated from the reaction mixture, may be freed from the remaining reaction products by boiling for a short time in ordinary concentrated (69 percent) nitric acid, which converts the impurities into water-soluble substances while leaving the 1,6-dinitronaphthalene untouched.

It will thus be seen that the essence of our invention is our discovery of the surprising and hitherto undiscovered sensitivity of 1,7-dinitronaphthalene to attack by the alkaline reagents described, and the immunity of the 1,6-isomer to such attack. It is this completely unexpected difference in the behavior of the 1,6- and 1,7-isomers which makes possible for the first time an effective and substantially quantitative separation of 1,6 - dinitronaphthalene and, consequently, the practical production of this compound on a commercial scale. A substantial contribution to the knowledge of the chemistry of naphthalene is also made by this discovery.

The examples given below will illustrate in greater detail the principles and practice of our invention, which is obviously not limited thereby.

*Example 1.—Use of Sodium Methoxide in Methanol*

Three hundred parts by weight of a mixture of 1,6- and 1,7-dinitronaphthalenes, in substantially equal proportions, obtained by the dinitration of 2-nitronaphthalene according to the process of Hyman and Lee previously referred to, were added to a solution of 100 parts of sodium methoxide in 2400 parts of methanol. This mixture was stirred for 6 hours at a temperature of about 55° C., after which it was cooled to about 30° C. and then vacuum filtered. The solids which remained on the filter were washed with 240 parts of cold methanol, followed by 1,000 parts of water. The resulting cake was dried, and was found to consist of 125 parts of 1,6-dinitronaphthalene with a purity in excess of 95 percent as determined by I-R spectrophotometric analysis. The alkaline methanolic filtrates were worked up for 4,6-dinitro-1-methoxynaphthalene and its corresponding naphthol, as well as for 8-nitro-1,2- naphthoquinone-2-oxime, all of which are reaction products of 1,7-dinitronaphthalene. Generally speaking, dilute methoxide solutions favor the production of the last-named derivative at the expense of the first, while prolonged reaction times tend to promote cleavage of the first-named derivative to form the corresponding naphthol. Temperatures much in excess of about 45° to 55° C. are generally to be avoided, as such higher temperatures tend to promote the formation of undesirable polymeric material.

If a higher purity 1,6-dinitronaphthalene is desired, the product prepared as above may be refluxed for about 15 minutes with five times its weight of concentrated (69 percent) nitric acid. This treatment effectively destroys any naphthols, quinone oximes, or methoxynaphthalenes which may contaminate the 1,6-dinitronaphthalene. Recrystallization from acetone, isopropanol, or methylene chloride may also be employed as a final purification procedure.

*Example 2.—Use of Sodium Ethoxide in Ethanol*

To two hundred parts by weight of ethanol there were added 2.0 parts of sodium metal to form sodium ethoxide, or sodium ethylate. When the reaction was complete, 10.0 parts by weight of a mixture of 1,6- and 1,7-dinitronaphthalenes, obtained as specified in Example 1, were added, and the resulting slurry was heated at 50°–55° C. for 18 hours. On cooling, the slurry was filtered without dilution, and the resulting solids were washed repeatedly with cold water. These solids were 1,6-dinitronaphthalene, with less than 5 percent of 1,7-dinitronaphthalene as an impurity. The recovery of solids was 4.0 parts by weight.

*Example 3.—Use of KOH in Methanol*

Six parts by weight of the same starting mixture of dinitronaphthalenes as employed in Example 1 were dissolved in 100 parts of benzene and then mixed with 100 parts of methanol. This mixture was cooled to 10° C., and a solution of 20 parts of potassium hydroxide in 60 parts of methanol added slowly with stirring. After standing 24 hours at ice bath temperature the mixture was introduced into an excess of ice water, whereupon two liquid layers formed. The benzene layer was separated and the solvent distilled off, leaving a mixture of 1,6-dinitronaphthalene and the ether formed from the reacted 1,7-dinitronaphthalene, this ether being 4,6-dinitro-1-methoxynaphthalene. This mixture was refluxed with stirring at about 100° C. for 2 hours with 5 percent aqueous KOH and yielded unchanged insoluble 1,6-dinitronaphthalene and an alkaline solution containing the potassium salt of 4,6-dinitro-1-naphthol. The reaction mixture was then cooled and filtered, and the separated 1,6-dinitronaphthalene washed with water and dried. The alkaline filtrate was acidified with hydrochloric acid, whereupon the dinitronaphthol was precipitated and was subsequently filtered off, washed with water, and dried.

*Example 4.—Use of Aqueous KOH*

Ten parts by weight of the same starting mixture of dinitronaphthalenes employed in the previous examples were refluxed for 1 hour with stirring at 100° C. with 28 parts potassium hydroxide in 250 parts water, equivalent to a 2 Normal solution. After refluxing, the reaction mixture was cooled to room temperature, filtered, and the solids washed and dried. An excellent yield (87 percent of theoretical) was obtained of 1,6-dinitronaphthalene, with a purity of 95 percent as determined by I-R spectrophotometric analysis.

*Example 5.—Use of Aqueous NaOH*

Ten parts by weight of the same starting mixture of dinitronaphthalene utilized in the previous examples were refluxed with stirring for 16 hours with 200 parts of 0.25 Normal sodium hydroxide solution. The reaction mixture after refluxing and cooling to room temperature was worked up as in Example 4. The final solid product was 1,6-dinitronaphthalene with a purity of 90 percent as shown by I-R spectrophotometric analysis.

*Example 6.—Use of Aqueous Ca(OH)$_2$*

Five parts by weight of the same starting mixture of dinitronaphthalene used in the previous examples were refluxed with stirring for 96 hours in a mixture of 10 parts calcium hydroxide and 250 parts of water. The refluxed mixture was cooled to room temperature, the solids were filtered off, washed with water, dried, extracted with acetone, and the acetone solution then evaporated off. The residual solids consisted of 1,6-dinitronaphthalene of a purity of 90 percent as determined by I-R spectrophotometric analysis.

*Example 7.—Use of Aqueous Ba(OH)$_2$*

Ten parts by weight of the same starting mixture of dinitronaphthalenes used in the previous examples were refluxed with stirring for 16 hours with 200 parts of 0.25 Normal barium hydroxide solution. The refluxed solution was cooled to room temperature, the solids filtered off, washed with water, dried, extracted with acetone, and the acetone then evaporated off. The residue consisted of 1,6-dinitronaphthalene of a purity of 90 percent as determined by I-R spectrophotometric analysis.

It will be noted that in Examples 4, 5, 6 and 7, and in the second step of the process in Example 3, the aqueous alkaline solution is used at its reflux temperature, approximately 100° C. In all of these cases the separation and recovery of the 1,6-dinitronaphthalene is the prime consideration, and recovery of the reaction products of the alkali and 1,7-dinitronaphthalene of secondary or no importance.

From a consideration of the foregoing specification and examples it is evident that the basic process of our invention is susceptible to many modifications in detail which will naturally suggest themselves to one skilled in the art. Thus, for example, analogous alkaline compounds of the other alkali metals and alkaline earth metals may be used instead of those of the particular metals mentioned. Again, sodium carbonate and potassium carbonate may be utilized instead of the hydroxides, but the use of the carbonates is not preferred. Details of preparation may be changed in many respects in accordance with known procedures and techniques. All such modifications are deemed to be comprehended within the scope of the invention as defined in the claims.

We claim:

1. A process for treating a mixture of 1,6- and 1,7-dinitronaphthalene whereby a substantial portion of the 1,7-constituent of the mixture is converted into reaction products which are readily separable from 1,6-dinitronaphthalene and wherein the latter remains substantially unreacted comprising adding together said mixture and a solution of an alkaline reagent of the class consisting of alkali metal alkoxides, alkali metal hydroxides, and alkaline earth metal hydroxides to form an admixture, said admixture having the alkaline reagent constituent thereof at a concentration level adequate to enable decomposition by said reagent of a substantial portion of said 1,7-constituent, and maintaining said admixture under a temperature-time relationship adequate to enable said alkaline reagent to decompose said substantial portion of said 1,7-constituent.

2. The process of claim 1 wherein said alkaline reagent is selected from the class consisting of sodium methoxide, potassium methoxide, sodium ethoxide, potassium ethoxide, sodium hydroxide, potassium hydroxide, calcium hydroxide and barium hydroxide.

3. A process according to claim 1 in which the mixture of 1,6-dinitronaphthalene and 1,7-dinitronaphthalene is dissolved in an inert solvent prior to the adding together of said mixture and solution of alkaline reagent.

4. A process according to claim 3 in which the inert solvent is benzene.

5. A process according to claim 2 in which the alkaline reagent is sodium methoxide in solution in methanol.

6. A process according to claim 2 in which the alkaline reagent is sodium ethoxide in solution in ethanol.

7. A process according to claim 2 in which the alkaline reagent is potassium methoxide in solution in methanol.

8. A process according to claim 2 in which the alkaline reagent is potassium ethoxide in solution in ethanol.

9. A process according to claim 1, the alkaline reagent being alkali metal hydroxide in solution in methanol.

10. A process according to claim 1, the alkaline reagent being alkali metal hydroxide in solution in methanol.

11. A process according to claim 1, the alkaline reagent being alkali metal hydroxide in aqueous solution.

12. A process according to claim 1, the alkaline reagent being alkaline earth metal hydroxide in aqueous solution.

13. A process for treating a mixture of 1,6- and 1,7-dinitronaphthalene whereby a substantial portion of the 1,7-constituent of the mixture is converted into reaction products which are readily separable from 1,6-dinitronaphthalene and wherin the latter remains substantially unreacted comprising adding together said mixture and an alkaline reagent in solution selected from the class consisting of sodium methoxide dissolved in methanol, sodium ethoxide dissolved in ethanol, potassium methoxide dissolved in methanol, potassium ethoxide dissolved in ethanol, sodium hydroxide dissolved in methanol, sodium hydroxide dissolved in ethanol, potassium hyroxide dissolved in methanol, potassium hydroxide dissolved in ethanol, sodium hydroxide in aqueous solution, potassium hydroxide in aqueous solution, calcium hydroxide in aqueous solution, and barium hydroxide in aqueous solution to form an admixture, said admixture having the alkaline reagent constituent thereof at a concentration level adequate to enable decomposition by said reagent of a substantial portion of said 1,7-constituent, and maintaining said admixture under a temperature-time relationship adequate to enable said alkaline reagent to decompose said substantial portion of said 1,7-constituent.

No references cited.